No. 804,773. PATENTED NOV. 14, 1905.
D. A. SCHUTT.
GARDEN IMPLEMENT.
APPLICATION FILED FEB. 1, 1905.
2 SHEETS—SHEET 1.
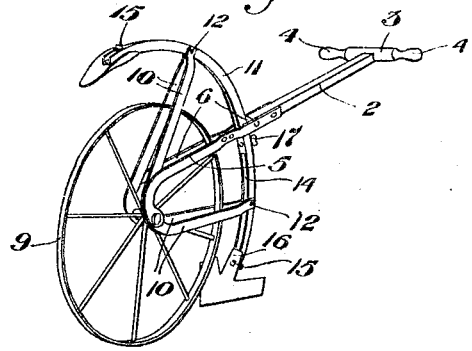
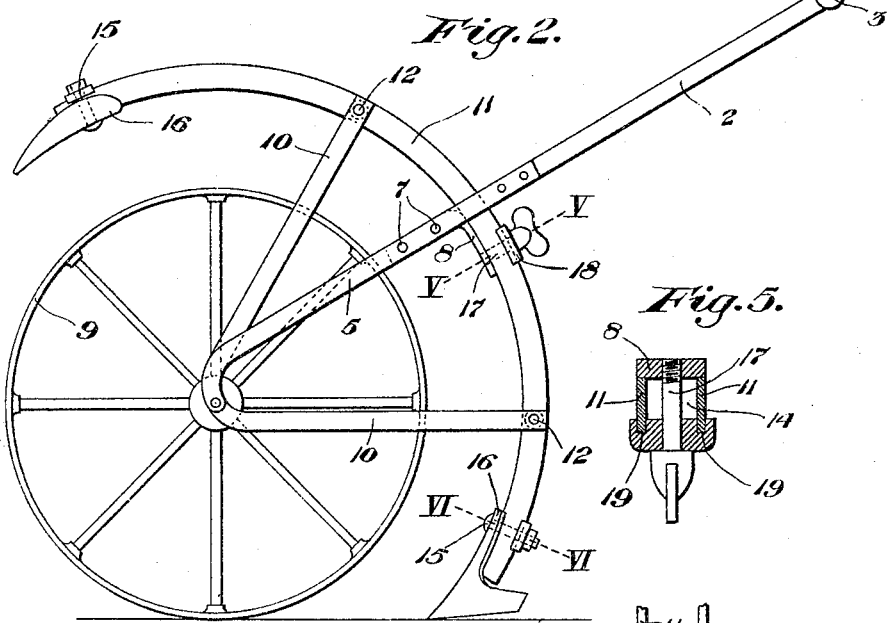
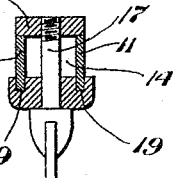
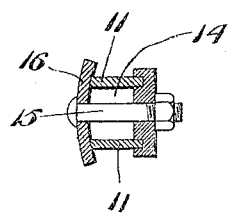
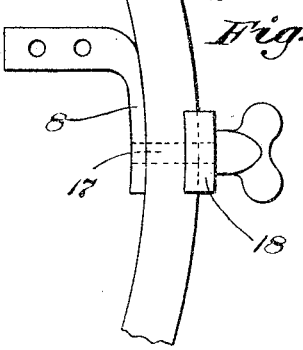
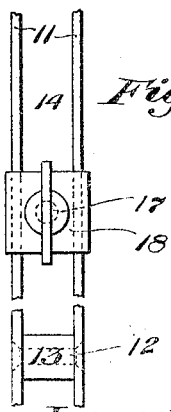
Witnesses:
E. R. Rodd
Chas. S. Sipley
Inventor:
Daniel A. Schutt
by C. M. Clarke
his attorney No. 804,773. PATENTED NOV. 14, 1905.
D. A. SCHUTT.
GARDEN IMPLEMENT.
APPLICATION FILED FEB. 1, 1905.

2 SHEETS—SHEET 2.

Witnesses:
E. R. Rodd.
Chas. S. Ripley

Inventor.
Dury A. Schutt
by C. M. Clarke
his Attorney

UNITED STATES PATENT OFFICE.

DUNY A. SCHUTT, OF PERU, INDIANA.

GARDEN IMPLEMENT.

No. 804,773. Specification of Letters Patent. Patented Nov. 14, 1905.

Application filed February 1, 1905. Serial No. 243,622.

*To all whom it may concern:*

Be it known that I, DUNY A. SCHUTT, a citizen of the United States, residing at Peru, in the county of Miami and State of Indiana, have invented certain new and useful Improvements in Garden Implements, of which the following is a specification, reference being had therein to the accompanying drawings, forming part of the specification, in which—

Figure 7:
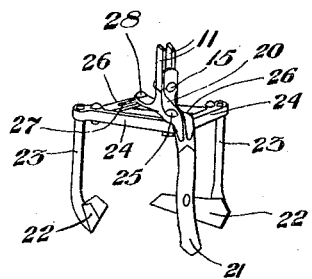
Figure 8:
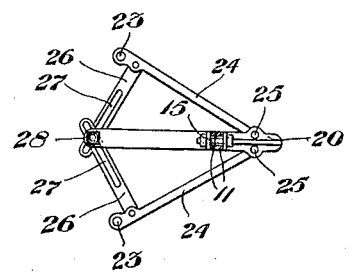
Figure 9:
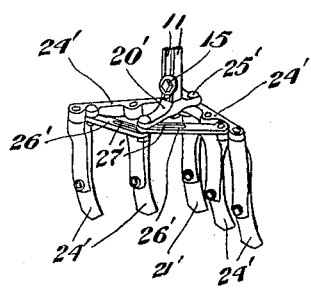
Figure 10:
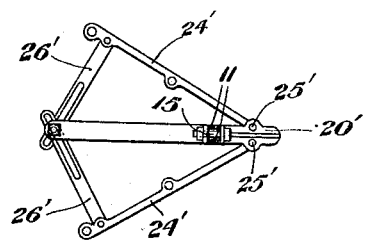
Figure 11:
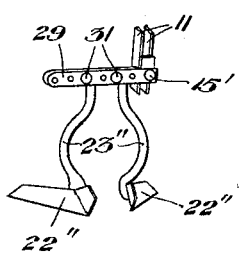
Figure 12:
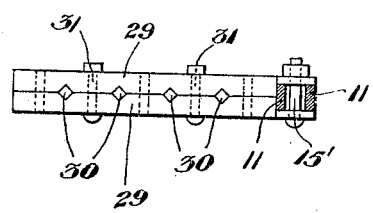

Figure 1 is a perspective view of my improved garden implement. Fig. 2 is a side elevation thereof. Figs. 3 and 4 are detail views, on an enlarged scale, showing the means for adjustably securing the tool-carrying bars with relation to the handle-bar. Fig. 5 is a detail sectional view on the line V V of Fig. 2. Fig. 6 is a sectional detail view on the line VI VI of Fig. 2. Fig. 7 is a perspective view showing adjustable scuffle-hoes attached to the implement. Fig. 8 is a plan view of Fig. 6. Fig. 9 is a view similar to Fig. 6 from the rear, showing a construction providing five cultivator-points arranged to be attached to the implement, said points being adjustable. Fig. 10 is a plan view of Fig. 8. Fig. 11 is a perspective view showing a further modified construction wherein scuffle-hoes are arranged with bowed carrying-frames adjustably mounted in a supporting-bar. Fig. 12 is a plan view of the supporting-bar.

My invention relates to an improvement in garden implements for hand use adapted to be used with various ground-cultivating tools— as plowshares, hoes, &c.—and which consists of a framework to which the various tools may be attached at one or both ends, means being provided for securing said framework to the handle-bar in various positions.

The particular features of improvement to which the invention relates are the means for adjusting the tool-holding frame and the handle by which means the apparatus is controlled and suited to the height of the operator, so that he may exert pressure against the ground to the best advantage; also, to the various improved attachments and to their manner of assemblage and adjustment, together with various details of construction, as shall be more fully hereinafter set forth.

Referring now to the drawings, 2 is the main shank or handle-bar, provided at its upper end with the cross-bar 3, having terminal handles 4, said entire bar forming one complete rigid framework by which the apparatus may be controlled and driven by the operator. To the lower end of bar 2 are attached the double bars 5 5, bolted or riveted on opposite sides to the main bar, forming lateral forks and providing an intervening space 6, within which is mounted the traction-wheel and through which passes the curved tool-holding frame. The bars 5 are connected together inside the tool-holding frame by bolts or rivets 7, passing through a nut-bracket 8, rigidly held between the bars and forming a bearing into which the securing-screw of the tool-holding frame is tapped. At their lower terminal portions the bifurcated bars 5 are preferably curved or rounded backwardly, terminating in axle-bearings, in which is mounted the traction-wheel 9, adapted to run upon the ground, by which construction it will be seen that the main handle-bar of the frame is supported on such traction-wheel and may be lowered or raised at will. Pivoted to the axle of the wheel is a frame composed of bars 10, arranged in segment form extending outwardly from the axle center and secured at their outer ends to arc-shaped bars 11 11, made of one and one-fourth inches by one-fourth inch steel or of other suitable construction and held together by bolts or rivets 12, which secure the arms 10 with intervening spreader-washers 13, thereby providing the intervening space 14. Between these bars 11 at one or both ends, as may be preferred, are suitably held any of the various cultivating tools or attachments by means of bolts 15, which pass between the embracing-bars and through the intervening tongue 16, extending upwardly or backwardly from the tool or attachment. Such embraced portion of the attachment is arranged to fit snugly between the bars 11 and against their front face and terminal ends, so that when tightly held by the bolt 15 the attachment will be immovably fixed, while being equally capable of ready and easy detachment. The body portion of the bars 11 between its terminals passes freely through the space of the handle-bar, to which the bars 11 are rigidly clamped and secured at varying positions by means of a bolt 17, which passes between the bars 11 and is tapped into the threaded portion of the nut-bracket 8, as clearly shown. The bolt 17 is provided with a flat thumb-screw-turning terminal, and underneath the head of said bolt is interposed a washer 18, provided with grooves 19, adapted to fit upon the rounded edges of bars 11. By this construction it will be seen that the tool-frame may be raised or lowered with relation to the handle-bar, or vice versa, and these two relatively movable parts may thus be tightly clamped together, so as to suit the stature of the operator or to vary the depth of operation of the implement in the ground. The adjustments are very quickly made, the construction is very simple, cheap, and durable, and the device as a whole is very rigid and capable of providing for the various conditions incident to the use of implements of this character.

In Figs. 7 to 10, inclusive, I have shown modified forms of tools known as "scufflehoes," mounted in such a manner as to provide for lateral adjustment. In Figs. 7 and 8 a frame 20 is secured to one terminal of bars 11 by the bolt 15 and is provided at its front portion with a cultivator-point 21 and with laterally-adjustable hoes 22, the shares of which are so arranged as to throw the earth inwardly toward the center. These hoes are secured to the lower ends of bars 23, projecting downwardly from arms 24, pivoted at 25 to the front end of frame 20 at each side and are provided with pivoted links 26, having slots 27, engaged by a common securing-bolt 28 in the back portion of frame 20. By this arrangement the arms 24 and hose 22 may be set inwardly or downwardly, as desired, to suit the various conditions of use. In Figs. 9 and 10 I show a similar arrangement providing a series of five points—to wit, a central front stationary point 21' and lateral points 22', mounted in the same manner on arms 24', pivoted by bolts 25' to frame 20' and capable of the same adjustment by means of the slotted arms 26' and locking-bolt.

In Fig. 11 I show a further modification, wherein scuffle-hoes 22'' are secured to the lower ends of carrying posts or legs 23'', which are bowed outwardly, as shown, so as to straddle the row of plants, the intervening space providing for clearance, the hoes in such construction being arranged to throw the earth outwardly. The upper ends of carrying-legs 23'' are mounted between clamping-bars 29, provided with V-shaped openings 30, adapted to grip the bar and secured together by bolts 31. One of the bars 29 is provided with a bolt 15', by which the entire clamp is rigidly secured in the terminal end of the frame-bars 11, as clearly shown. As thus constructed the clamp-bars extend outwardly to one side of the machine, thereby allowing the traction-wheel to be driven along one side of the row of plants, thus bringing the hoes into proper relation on each side of them.

The various attachments are adjustable, as described. They are all arranged for coöperation with the entire machine and provide for a considerable variety of cultivating operations, thus rendering the tool well adapted to many kinds of garden work.

While the implement attachments which I have shown are particularly adapted to the apparatus, it will be understood that various other forms or shapes of tools may be employed with equal advantage—as, for instance, rakes, &c.—and I do not desire to be confined to the exact constructions shown and described, but to include with the scope of the following claims all such different forms or any changes or modifications which may be made in the details of the apparatus by the skilled mechanic.

Having described my invention, what I claim is—

1. In a garden implement, the combination of a traction-wheel, a bifurcated handle-bar mounted thereon, a nut-bracket secured between the sides of the bar, double bars passing between the sides of the bifurcated bar and having a pivoted supporting-frame, and a securing-bolt passing between said double bars and tapped into said nut-bracket, substantially as set forth.

2. In a garden implement, the combination of a traction-wheel, a bifurcated handle-bar mounted thereon, a nut-bracket secured between the sides of the bar, double bars passing between the sides of the bifurcated bar and having a pivoted supporting-frame, and a securing-bolt passing between said double bars and tapped into said nut-bracket, with a sliding washer-bearing therefor having slots arranged to engage the curved edges of the bars, substantially as set forth.

3. In a garden implement, means for adjustably securing the tool-frame consisting of a nut-bracket secured between the bifurcated sides of the handle-bar, and a securing-bolt passing through the slot-like opening in the tool-frame and tapped into the said nut-bracket, with a sliding washer-bearing therefor, substantially as set forth.

4. A garden implement provided with a main handle-bar having bifurcated wheel-bearing terminals, a pivotally-mounted traction-wheel, a double-arc-shaped tool-bar having a longitudinal opening between the bars, a nut-bracket secured to the handle-bar, and a securing-bolt extending between the sides of the tool-bar and arranged to clamp the tool-bar to the nut-bracket at varying positions of the bar, substantially as set forth.

5. The combination with a bifurcated handle-bar, traction-wheel, and a relatively adjustable arc-shaped frame; of a terminal implement-frame having pivoted laterally-adjustable wings, and terminal tools mounted therein, substantially as set forth.

In testimony whereof I affix my signature in presence of two witnesses.

DUNY A. SCHUTT.

Witnesses:
  J. H. SHIRK,
  GEORGE W. KENNY.